United States Patent [19]

Lassiaz

[11] Patent Number: 4,565,271

[45] Date of Patent: Jan. 21, 1986

[54] OPERATING MEMBER FOR CLUTCH DIAPHRAGM SPRING, AND PROCESS FOR MOUNTING IT THEREON

[75] Inventor: Philippe Lassiaz, Boulogne, France

[73] Assignee: Valeo, Paris, France

[21] Appl. No.: 535,071

[22] Filed: Sep. 23, 1983

[30] Foreign Application Priority Data

Sep. 23, 1982 [FR] France ................................ 82 16045

[51] Int. Cl.⁴ .............................................. F16D 13/44
[52] U.S. Cl. ..................................... 192/89 B; 192/98
[58] Field of Search ...................... 192/70.27, 89 B, 98

[56] References Cited

U.S. PATENT DOCUMENTS 2,445,638  6/1948  Saks ......................................... 267/1

FOREIGN PATENT DOCUMENTS 1174298  3/1959  France .
1271631  8/1961  France .
1595078  7/1970  France .
2131731  11/1972  France .
1221761  2/1971  United Kingdom .

Primary Examiner—Stephen F. Husar
Attorney, Agent, or Firm—Charles E. Brown; Charles A. Brown

[57] ABSTRACT

For the operation of a diaphragm by a clutch release bearing, there is attached on the diaphragm an operating member comprising in the form of a single piece, an annular collar intended to act by means of a support face on the ends of the fingers of the diaphragm and at least two retaining shoulders adapted to secure it axially on the diaphragm. The retaining shoulders are turned axially in the direction of the support face of the collar. The support face, being curved, accommodates the bending of the fingers of the diaphragm. Advantageously the operating member is fitted onto the diaphragm without stressing any of the fingers thereof.

15 Claims, 12 Drawing Figures

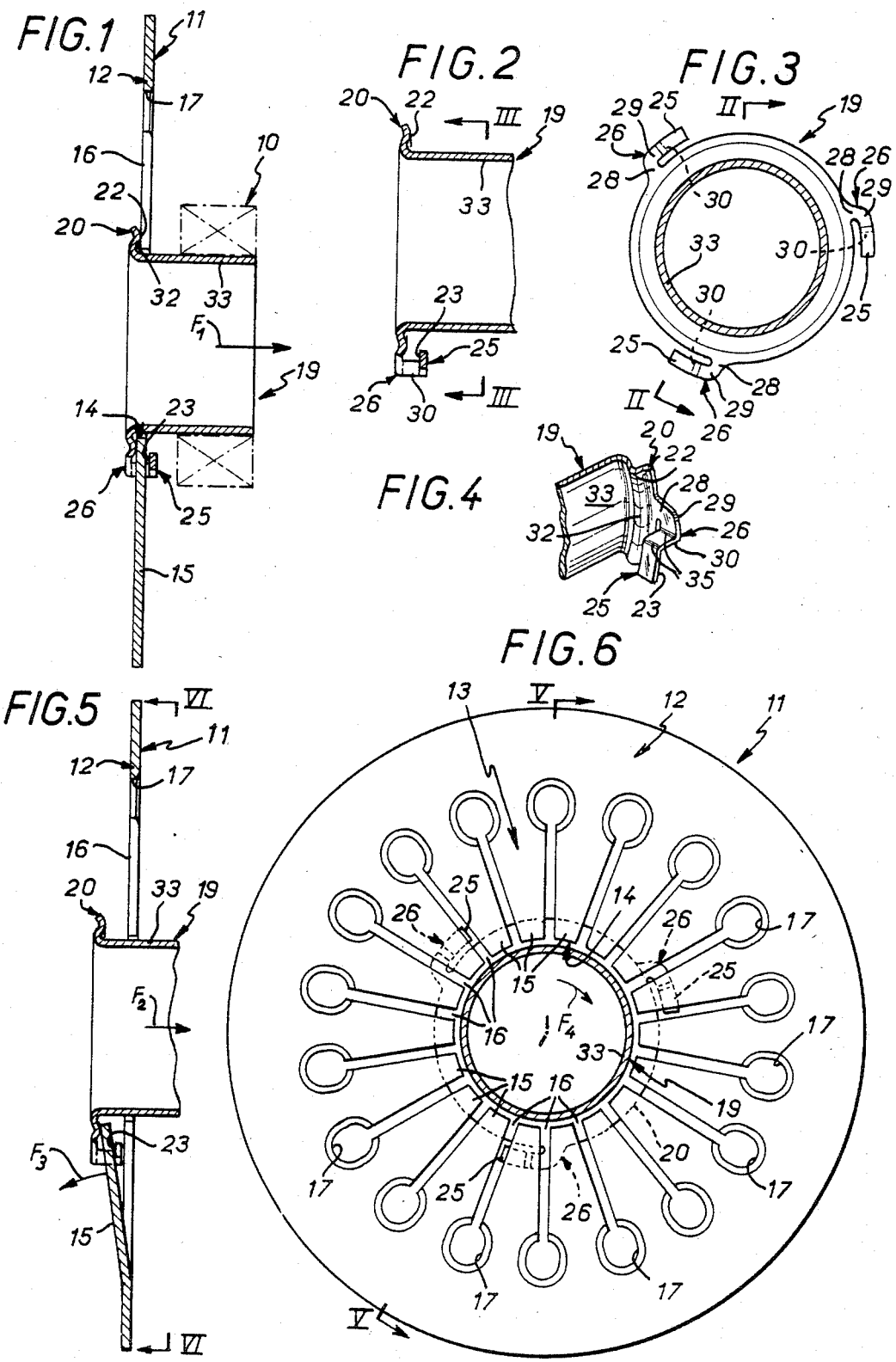

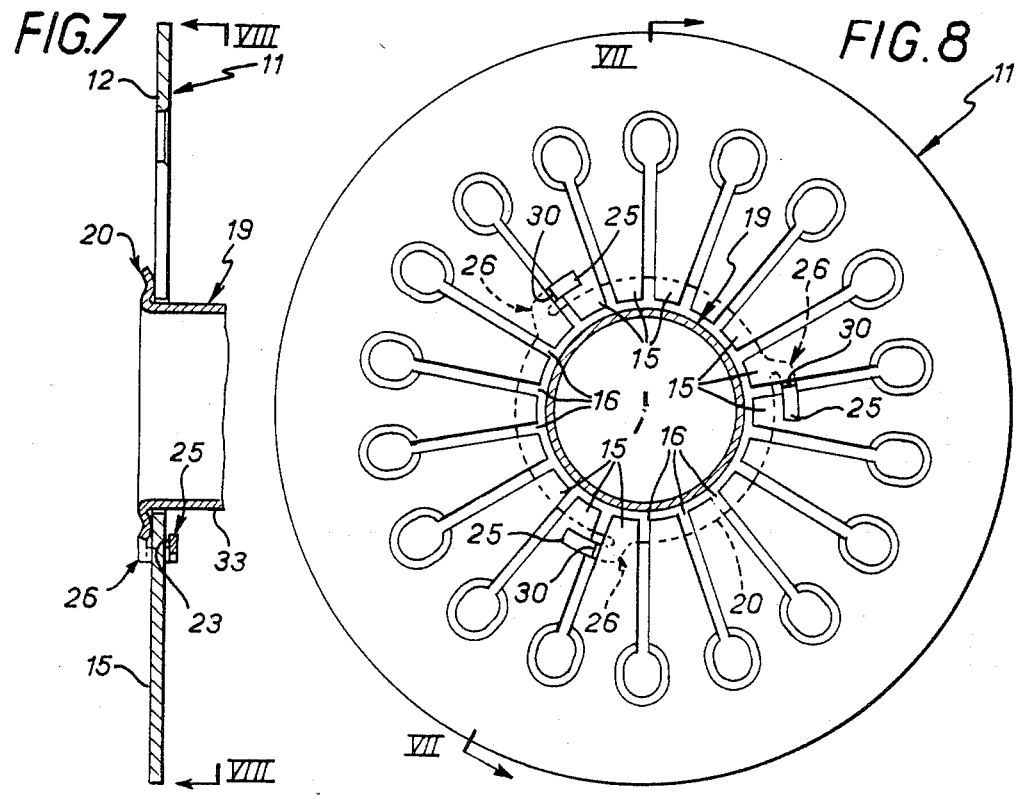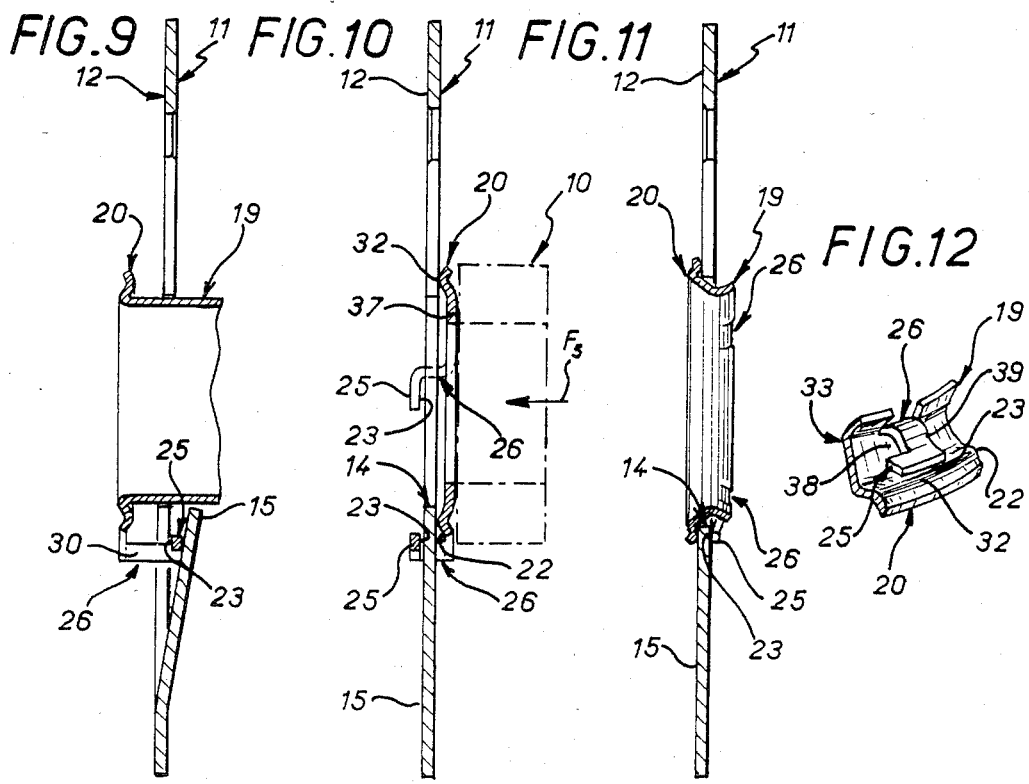

OPERATING MEMBER FOR CLUTCH DIAPHRAGM SPRING, AND PROCESS FOR MOUNTING IT THEREON

BACKGROUND OF THE INVENTION

The present invention relates generally to diaphragm clutches, particularly for motor vehicles, such clutches being of the kind in which the resilient means provided for their engagement consists of an annular member, known as a diaphragm, which comprises a peripheral portion forming a conical plate spring integral with a central portion divided into fingers by radially-directed slots.

In order to release clutches of this kind it is necessary to apply a disengaging force to the ends of the radial fingers of the diaphragm using a disengaging member, usually called a release bearing assembly.

A release bearing assembly of this kind generally contains a ball bearing serving to separate, in respect of rotation, that member of the assembly which is intended to act on the diaphragm and which is usually called the actuating member, from the member, usually called the control member, which is adapted to be operated for this purpose by a release mechanism, which is usually a clutch release yoke; the assembly is designed to act on diaphragm either by thrust or by traction.

When it acts by thrust, one of the rings of the bearing, forming the actuating member, may very simply bear directly against the ends of the fingers of the diaphragm.

However, in practice, since the diaphragm is generally flat when the clutch containing it is in the position of engagement and if the friction linings of its friction disc are in new condition, toric contact is desirable between this bearing ring and the diaphragm fingers because of the conical shape assumed by them through flexion when their ends are subjected to an axial thrust applied by the bearing ring. For this purpose the fingers of the diaphragm may have a rounded boss at their ends.

This arrangement, which has the advantage of permitting the use of a bearing having a plane actuating edge, has the disadvantage of requiring the application of a special configuration to the ends of the diaphragm fingers.

As an alternative, the ends of the diaphragm fingers may be plane, but the actuating edge of the bearing must then itself be torically rounded.

In either case, difficulties may arise on the occasion of an overhaul or rebuilding of a clutch entailing the changing of the diaphragm, if the diaphragm available for this change is not suitable for the clutch release bearing fitted.

It is therefore desirable, particularly in cases of this kind, to have a part available which for the sake of convenience will be called an operating member, and which, when attached to the ends of the diaphragm fingers, accommodates the bending of the latter during operation, while offering to the corresponding clutch release bearing a plane support surface.

When the clutch release bearing acts by traction on the clutch diaphragm, it is necessary for it to have an annular collar, which for the sake of convenience will be called a support collar or ring, and which is disposed axially on the other side of the diaphragm, or for it to be axially fastened to an operating member having a support collar of this kind.

An operating member of this kind usually forms one of the components of the clutch release bearing, and this results in a certain overall complexity of the latter.

It is therefore desirable to be able to have available an operating member which, when attached independently on the ends of the fingers of a diaphragm, is then adapted to be axially connected to a clutch release bearing in order to enable the latter to act by traction on the diaphragm.

In French patent application filed on Mar. 24, 1972 under No. 72 11145 and published under No. 2.131.731, a diaphragm clutch is described, on the diaphragm of which an operating member of this kind is permanently attached in order to operate a withdrawal member, which in this particular case is reduced to a thrust rod serving as clutch release bearing.

This operating member comprises on the one hand, on a first side of the diaphragm, a support collar applied against the diaphragm by a support face and on the other hand, on the other side of the diaphragm, retaining shoulders adapted to secure it axially to the latter.

However, the retaining shoulders are formed thereon by the ends of elastically deformable tongues which, being parts separate from the operating member itself, are each individually attached on the latter by suitable fastening means.

This results in a relatively complex arrangement, which is therefore expensive, while it is also possible for the retaining shoulders to become detached from the diaphragm fingers against which they bear, through the rotation about their fastening means of the elastically deformable tongues on which they are formed.

In addition, although for the purposes of placing an operating member of this kind in position on the diaphragm to which it is to be fitted it is sufficient to present this member axially in front of the diaphragm in such a manner that the elastically deformable tongues provided on it are in line with the slots in the diaphragm and can thus pass axially through the latter, and then to turn this operating member about the axis of the assembly until these elastically deformable tongues are engaged on the fingers of the diaphragm, it is necessary in practice, because of the circumferential extent of the ends of these elastically deformable tongues forming the retaining shoulders, to widen accordingly those slots in the diaphragm in which they are to be engaged.

The consequence is that the fingers of the diaphragm do not all have the same configuration at their ends, and that therefore they do not all work under the same conditions, which is prejudicial to the whole arrangement.

In French Pat. No. 1595078 of the Dec. 13, 1968 a clutch diaphragm equipped with an operating member is described.

Although in this French patent the operating member has the advantage of being in one piece, the retaining shoulders provided on it being integral with its support collar, the entire member, comprising the support collar and the retaining shoulders, extends on the same side of the diaphragm, so that those fingers of the diaphragm which are in engagement with the retaining shoulders are permanently bent.

The placing in position of an operating member of this kind in fact makes it necessary, after the diaphragm and the operating member have been brought sufficiently close to one another, for the ends of as many diaphragm fingers as there are retaining shoulders on the operating member to be bent relative to the others in the axial direction, and then for the operating member to be turned circumferentially about the axis of the assembly, relative to the diaphragm, while at the end of this rotation those diaphragm fingers which have been engaged with the retaining shoulders of the operating member are prevented by the latter from returning to their original natural configuration.

Apart from the fact that in the zone in which these fingers merge into the peripheral diaphragm portion forming the conical spring plate this results in an inopportune modification of the distribution of stresses in the peripheral portion, the operating conditions of which are liable to be disturbed thereby, these fingers are prevented from suitably participating in the axial clutch release force which has to be transmitted when the clutch is disengaged, to the detriment of the efficiency of the whole arrangement.

Moreover, because the retaining shoulders are disposed at the bottom of cutouts leading out onto the support force of the support collar for penetration into the said cutouts of those fingers of the diaphragm which are to cooperate with the said retaining shoulders, the said support force of the support collar is discontinuous to the detriment of the rigidity of the latter and the extent of its surface of contact with the diaphragm, and the axial dimensions of the whole arrangement are relatively large.

The general object of the present invention is an arrangement which enables these aforesaid disadvantages to be avoided.

SUMMARY

More particularly, the invention provides in one aspect, an operating member which is to be attached to the ends of the fingers of the diaphragm of a clutch, of the type comprising a one-piece annular collar, referred to as a support collar, which extends substantially radially and which by one of its faces, referred to as the support face, is intended to come to bear against the ends of the fingers of the diaphragm to which it is to be fitted, and further comprising at least two retaining collars which are adapted to secure it axially to the diaphragm, this operating member being characterised in that the retaining shoulders are turned axially in the direction of the support face of the support collar.

Thus the operating member according to the invention is in combination, on the one hand, composed of a single piece, so that its manufacture is advantageously and economically simplified, and on the other hand, because of its support collar and its retaining shoulders, is adapted to frame axially, by itself, the diaphragm to which it is to be fitted, the support collar being disposed on a first side of the diaphragm and the retaining shoulders on the other side of the latter, so that none of the fingers of the diaphragm is subjected to any definitive bending.

In practice, each of the retaining shoulders provided on the operating member according to the invention is formed on a retaining finger which extends substantially circumferentially at the end of a support leg generally parallel to the associated support collar.

Likewise in practice, the support leg extends from the support collar. For example, it may extend from the outer periphery of the support collar.

As an alternative, it may extend from the inner periphery of the support collar, even when the corresponding operating member comprises a sleeve which is generally axial, starting from the said inner periphery, over at least a part of its path and the support leg is then axially integral with the axial sleeve, being circumferentially continuous with the latter.

In all cases, the support force of the support collar, that is to say the force by which this collar bears against the diaphragm, is always advantageously continuous, which is favourable both for the rigidity of the support collar and for the extent of its surface of contact with the diaphragm, and therefore for a reduction of wear on this contact surface.

Likewise in all cases, the operating member according to the invention simply requires, for it to be placed in position, that the diaphragm and the operating member should be brought close to one another, that certain of the fingers of the diaphragm should be temporarily bent, and that the operating member should be turned relative to the diaphragm, without definitive bending of the respective diaphragm fingers by the retaining shoulders of the operating member.

In this respect the present invention has another aspect, comprising a process for the placing in position, on the ends of the fingers of the diaphragm of a clutch, of a one-piece operating member comprising an annular collar, referred to as the support collar, which extends substantially radially and which by one of its faces, referred to as the support face, is intended to bear against the ends of the fingers of the diaphragm which is to be equipped with it, on a first side of the diaphragm, and, on the other side of the diaphragm, at least two retaining shoulders which are adapted to secure it axially on the diaphragm, this process being of the type in which, after the diaphragm and the operating member have been brought sufficiently close to one another, the ends of as many diaphragm fingers as there are retaining shoulders on the operating member are bent relative to the others in the axial direction, then the operating member is turned circumferentially about the axis of the assembly, relative to the diaphragm, and this process being characterised in that, the operating member having in accordance with the invention retaining shoulders formed on retaining fingers extending circumferentially at the end of support legs adapted to pass axially through the diaphragm, the previously bent fingers of the diaphragm are then allowed to return to their original configuration.

The present invention has as a further object a unitary assembly for a clutch, of the kind formed on the one hand by a diaphragm and on the other hand of an annular member, known as the operating member, attached to the ends of the fingers of the said diaphragm, this unitary assembly being characterised in that the operating member is in one piece according to the invention, as briefly described above.

In practice, a unitary assembly of this kind is very particularly characterised in that, the retaining shoulders formed on the operating member being formed on retaining fingers which extend circumferentially at the end of support legs, these support legs pass axially through the diaphragm with the aid of slots existing between the fingers of the latter, or else by way of its axial cavity.

In all cases, the diaphragm in a unitary assembly of this kind has, at rest, a configuration identical to that which it would have if it were not provided with an operating member.

In addition, the ends of these radial fingers all have the same contour.

The engagement on the diaphragm of the operating member according to the invention in fact has the advantage of not requiring any particular cutting out for certain of the fingers of the diaphragm, since this engagement needs only the slots separating pairs of these fingers or else the axial cavity surrounded by them.

BRIEF DESCRIPTION OF THE DRAWINGS

FIG. 1 is a view in axial section of a unitary assembly for a diaphragm clutch according to the invention;

FIG. 2 is a partial view in axial section, to the same scale, of the operating member only of a unitary assembly of this kind, this axial section being taken on the broken lines II—II in FIG. 3;

FIG. 3 is a view in cross-section of this operating member, taken on the line III—III in FIG. 2;

FIG. 4 shows, to a different scale, a partial view in perspective thereof;

FIGS. 5 and 6 are views in axial section and cross-section respectively illustrating a first phase of the positioning of the operating member according to the invention on the diaphragm to which it is to be fitted;

FIGS. 7 and 8 are similar views to FIGS. 5 and 6 respectively, illustrating a second phase of this positioning operation;

FIG. 9 is a similar view to FIG. 5 and illustrates an alternative method;

FIG. 10 is a view similar to FIG. 7 and relates to an alternative embodiment;

FIG. 11 is likewise a view similar to FIG. 7 and relates to yet another embodiment;

FIG. 12 is a partial view in perspective of the operating member used in this last embodiment.

DETAILED DESCRIPTION OF THE PREFERRED EMBODIMENTS

FIGS. 1 to 9 illustrate the application of the invention to a pulled clutch release bearing 10, that is to say a clutch release bearing intended to act by traction on the diaphragm 11 of the clutch which it is to control. For the purpose of acting on the diaphragm 11 this clutch release bearing 10 is itself subjected, by any suitable control means (not illustrated), to traction which as shown by the arrow F1 in FIG. 1 urges it in the opposite direction to the diaphragm 11.

Since a clutch release bearing of this kind does not in itself form part of the present invention, it has only been indicated schematically in FIG. 1 and will not be described in further detail.

In a manner known per se, the diaphragm 11 which the clutch release bearing has to control is a generally annular part comprising, in the form of a single piece, a circularly continuous peripheral portion 12, which is adapted to form a conical plate spring and a central portion 13 which is split up into radial fingers 15, around an axial cavity 14, by radial slots 16, each of which starts individually from a passage 17 of larger section situated at the root of the radial fingers 15, between the peripheral portion 12 and the central portion 13 (FIGS. 1 and 6).

These arrangements are well known per se and, since they do not form part of the present invention, they will not here be described in greater detail.

Likewise in a manner known per se, in order to enable the clutch release bearing 10 to act on the diaphragm 11 there is associated with the latter a member 19, which here for the sake of convenience is called an operating member, and which likewise constitutes an annular part and is adapted to be attached to the ends of the radial fingers 15 of the diaphragm 11.

The operating member 19 comprises generally an annular collar 20, which for the sake of convenience is referred to as a support collar, and which extends substantially radially. One face 22 of the support collar, referred to as the support face, is adapted to come to bear against the ends of the radial fingers 15 of the diaphragm 11, on the opposite side of the latter to that where the clutch release bearing 10 is disposed, and the support collar further comprises at least two shoulders 23, which are adapted to secure it axially to the diaphragm 11.

According to the invention, the operating member 19, which is shown by itself if FIGS. 2 to 4, is in one piece and the retaining shoulders 23 with which it is provided are turned axially in the direction of the support face 22 of the support collar 20, so that they can cooperate with that face of the diaphragm 11 which faces the clutch release bearing 10.

In practice, three retaining shoulders 23 are provided, regularly distributed circularly around the axis of the assembly, and each of them is formed on a retaining finger 25 which extends substantially circumferentially at the end of a support leg 26, generally in a direction parallel to the support collar 20.

In practice, each support leg 26 extends from the support collar 20 and, more precisely, in this embodiment, from the outer periphery of this support collar 20, being integral with the latter.

In succession from the support collar 20 to the corresponding retaining finger 25, the support leg 26 comprises a first portion 28 which extends substantially radially, a second portion 29 which, in the plane of the first portion 28, extends substantially circumferentially, and a third portion 30 which extends generally axially and substantially at right angles to the plane of the previously mentioned portions 28 and 29, being joined at right angles both to the portion 29, which it follows, and to the respective retaining finger 25.

Likewise in practice, the circumferential length of a retaining finger 25 is preferably less than the sum of the width of a finger 15 of the diaphragm 11 and that of a slot 16 in the diaphragm, both measurements being taken on the circumference along which the respective retaining finger 25 extends, it being obvious that the shorter the circumferential length of the latter, the greater its rigidity will be.

In order to be adapted to act on the diaphragm 11, the support collar 20 is provided annularly, on its support face 22 and in the direction of the retaining shoulders 23, with a rounded boss 32 which in practice, in the embodiment illustrated, is formed by a dished portion of the said support collar 20 and which is advantageously circumferentially continuous.

Finally, in the embodiment illustrated, the operating member 19 being intended to cooperate with a clutch release bearing acting by traction, comprises, starting from the inner periphery of its support collar 20 and integral with the latter, a generally axial sleeve 33 which extends on the side on which the retaining shoulders 23 are disposed and projects substantially beyond the latter.

As will be noted, the retaining shoulders 23 are radially spaced apart from this axial sleeve 33, being externally distant from the latter by a radial dimension at least equal to the radial width of the support collar 20.

The operating member according to the invention can easily be produced, for example by cutting out and pressing the member in a suitable manner from a metal blank.

For preference, and as illustrated, the fold lines 35 delimiting the third portion 30 of its support legs 26 extend substantially radially, so that circumferentially a third portion of this kind has a slight thickness, of the order of that of the original blank, and in any case less than the circumferential width of a slot 16 in the diaphragm 11.

The operating member 19 according to the invention can be placed in position on the diaphragm 11 in the following manner, for example: after the diaphragm 11 and the operating member 19 have been brought sufficiently close axially to one another to bring the axial sleeve 33 of the operating member 19 into axial engagement in the axial cavity 14 of the diaphragm 11, in the direction of the arrow F2 in FIG. 5, the ends of as many radial fingers 15 of the diaphragm 11 as there are retaining shoulders 23 on the operating member, in this particular case three, are bent axially in relation to the other fingers, in the direction of the arrow F3 in FIG. 5, and then circumferentially in the direction of the arrow F4 in FIG. 6, and when three fingers of the diaphragm 11 have been bent in this manner the operating member 19 is rotated about the axis of the assembly relative to the diaphragm 11.

At the end of this relative rotation of the operating member 19, the retaining fingers 25 formed on the latter straddle those radial fingers 15 of the diaphragm which had previously been bent (FIG. 8), on the opposite side of these radial fingers to that where the associated support collar 20 is disposed.

It is then sufficient to allow the previously bent radial fingers 15 of the diaphragm 11 to return to their original configuration (FIG. 7).

The operating member 19 according to the invention is then in fact suitably fastened to the diaphragm 11, the latter being gripped axially, in practice with play, between, on the one hand, on a first side, the support collar 20 of the operating member 19 and, on the other hand, on the opposite side, the retaining fingers 25 of the operating member 19, the support legs 26 of these retaining fingers 25 passing axially through the diaphragm 11 by their third portion 30, which passes through the slots 16 formed in the diaphragm 11.

In the unitary assembly thus composed of a diaphragm 11 and an operating member 19 attached to it, the diaphragm 11 is entirely in the configuration which was its actual original configuration, and it did not have to undergo any special cutting or permanent deformation for the attachment of the operating member 19.

It therefore fully retains its inherent mechanical characteristics without any modification, and each of the fingers 15 is in contact with the rounded boss 22 formed on the support collar 20 of the operating member 19, which is favourable to the minimisation of wear.

The unitary assembly formed by the diaphragm 11 and the operating member 19 can advantageously be handled as a unit, particularly for the assembly of the clutch mechanism and the equipment for which it is intended.

It is then sufficient to fasten the corresponding clutch release bearing 10 axially to it.

Since the manner in which this fastening is done does not form part of the present invention, it will not be described here.

According to the alternative method illustrated in FIG. 9, the rigidity of the support legs 26 of the retaining fingers 25, and more precisely that of their axial portion 30, is utilised in order to effect by means of these legs the bending of the fingers 15 of the diaphragm 11 which adjoin those on which the retainint fingers 25 are to be engaged.

FIG. 10 illustrates the application of the invention to the case where the clutch release bearing 10 is intended to act by thrust on the diaphragm 11, that is to say the case in which in order to act on the diaphragm 11 the associated control means urges it in the direction of the diaphragm 11, as shown by the arrow F5 in FIG. 10.

In such cases the operating member is not provided with an axial sleeve and its support collar 20 is extended radially, in the direction of the axis of the assembly, to a sufficient extent to form a support ring 37 suitable for the action of the clutch release bearing 10.

While, as previously, the collar 20 is provided with a circumferentially continuous rounded boss 32 for the purpose of acting on the diaphragm 11, a support ring 37 of this kind can advantageously provide a plane support surface for the clutch release bearing 10, so that the latter can also have for that purpose an advantageously plane operating or engagement surface.

Otherwise, the mode of construction and method of attachment are identical to those described above.

The axial compactness of this embodiment will be appreciated. In the embodiments described above, the support legs 26 of the retaining fingers 25 extend from the outer periphery of the support collar 20.

As an alternative, they may extend from the inner periphery of the support collar 20.

This possibility is illustrated in FIGS. 11 and 12, which relate, by way of example, to the case in which the associated clutch release bearing is a pulled clutch release bearing (not shown in the drawings).

In the embodiment illustrated each support leg 26 comprises in succession, from the support collar 20 to the corresponding retaining finger 25, a first portion 38 which extends substantially axially and a second portion 39 which extends substantially radially.

In cases where, as illustrated, the operating member 19 has an axial sleeve 33 extending from the inner periphery of its support collar 20 while the associated clutch release bearing 10 is a pulled release bearing, the axial portion 38 of each support leg 26 may obviously be laterally integral with such an axial sleeve 33 over at least part of its extent, being circumferentially continuous with the said sleeve, as illustrated.

In the embodiment illustrated, the axial sleeve 33 has in practice only a short axial length and it has the general shape of a venturi, having two generally frustoconical portions, one on each side of a central neck of smaller diameter. The retaining shoulders 23 formed on the operating member 19 in this embodiment, as in previously described embodiments, are still radially at a distance from its axial sleeve 33.

The manner in which this form of construction of the operating member 19 is positioned on the diaphragm 11 to which it is to be fitted is idential to that previously described.

However, as will be noted, in this embodiment the support legs 26 of the retaining fingers 25, and therefore also of the retaining shoulders 23, pass axially through the diaphragm 11, not by way of the slots 16 in the latter, but by way of its axial cavity 14.

Consequently, since this embodiment has no part inserted into the diaphragm slots, it is advantageously capable of having greater transverse play in relation to the diaphragm, at right angles to the axis of the assembly, and this is favourable to the self-centering of the associated clutch release bearing when the latter is of the self-centering type.

In addition, during its manufacture there is minimum wastage, since the support legs formed on it can be formed from the inevitable central waste portion corresponding to its axial cavity.

The present invention is not limited to the embodiments described and illustrated, but includes all variants of construction and/or of combinations of their various elements.

What I claim is:

1. An operating member to be attached to the ends of the fingers of a diaphragm of a clutch, said operating member comprising in the form of a single piece, an annular support collar which extends substantially radially and which by one of its faces, referred to as support face, is adapted to come to bear against the ends of the fingers of the diaphragm to which it is to be fitted, and further comprising at least two retaining shoulders which are adapted to secure it axially to the diaphragm, wherein said retaining shoulders are turned axially in the direction of the support face of said support collar.

2. An operating member according to claim 1, wherein each of said retaining shoulders is formed on a retaining finger which extends substantially circumferentially at the end of a support leg, in a direction generally parallel to said support collar.

3. An operating member according to claim 2, wherein said support leg of a retaining finger extends from said support collar.

4. An operating member according to claim 3, wherein said support leg of a retaining finger extends from the outer periphery of said support collar.

5. An operating member according to claim 4, wherein said support leg of a retaining finger comprises, in succession from said support collar to said retaining finger, a first portion which extends substantially radially, a second portion which extends substantially circumferentially, and a third portion which extends substantially axially.

6. An operating member according to claim 3, wherein said support leg of a retaining finger extends from the inner periphery of said support collar.

7. An operating member according to claim 6, wherein said support leg of a retaining finger comprises, in succession from said support collar to said retaining finger a first portion which extends substantially axially, and a second portion which extends substantially radially.

8. An operating member according to claim 7 further comprises a generally axial sleeve starting from the inner periphery of its support collar, wherein over at least part of its extent, the axial portion of said support leg of a retaining finger is laterally integral with said axial sleeve; and being circumferentially continuous with the latter.

9. An operating member according to claim 2, comprising a generally axial sleeve starting from the inner periphery of its support collar, wherein its retaining shoulders are radially distant from said axial sleeve.

10. An operating member according to claim 2 wherein three retaining shoulders are provided and are regularly distributed circularly.

11. A process for placing in position, on the ends of the fingers of the diaphragm of a clutch, an operating member comprising, in the form of a single piece, an annular support collar, which extends substantially radially and which by one of its faces, referred to as the support face, is intended to come to bear against the ends of the fingers of the diaphragm to which it is to be fitted, on a first side of the diaphragm and, on the other side of the latter, at least two retaining shoulders which are adapted to secure it axially on the diaphragm, according to which process, after the diaphragm and the operating member have been brought sufficiently close to one another, the ends of as many fingers of the diaphragm as there are retaining shoulders on the operating member are bent axially relative to the others, and then the operating member is rotated circumferentially, about the axis of the assembly, relative to the diaphragm; the operating member having retaining shoulders formed on retaining fingers extending circumferentially at the ends of support legs and adapted to pass axially through the diaphragm, the previously bent fingers of the diaphragm are then allowed to return to their original configuration.

12. An assembly for a clutch comprising an annular diaphragm formed in a single piece and having a peripheral portion forming a conical spring plate and a central portion split up into radial fingers, an annular operating member being attached to the ends of the radial fingers of said diaphragm, said operating member comprising in the form of a single piece, an annular support collar which extends substantially radially and which by one of its faces, referred to as a support face, is adapted to come to bear against the ends of the radial fingers of said diaphragm to which it is to be fitted, and further comprising at least two retaining shoulders which are adapted to secure it axially to said diaphragm, wherein said retaining shoulders are turned axially in the direction of the support face of said support collar.

13. An assembly according to claim 12, wherein said retaining shoulders formed on the operating member are formed on retaining fingers which extend circumferentially at the ends of support legs, and wherein said support legs pass axially through said diaphragm.

14. An assembly according to claim 13 wherein said support legs of the retaining shoulders of the operating member pass axially through diaphragm by way of the slots existing between the fingers of the latter.

15. An assembly according to claim 13, wherein said support legs of the retaining shoulders of the operating member pass axially through the diaphragm by way of the axial cavity of the latter.

* * * * *